Aug. 25, 1936.   R. B. DAY   2,051,939

PROCESS OF IMPROVING GASOLINE

Original Filed Feb. 27, 1931

Inventor
Roland B. Day.
By Stone, Boyden, Mack & Stern
Attorneys.

Patented Aug. 25, 1936

2,051,939

UNITED STATES PATENT OFFICE 2,051,939

PROCESS OF IMPROVING GASOLINE

Roland B. Day, Chicago, Ill., assignor, by mesne assignments, to Universal Oil Products Company, Chicago, Ill., a corporation of Delaware Application February 27, 1931, Serial No. 518,795
Renewed October 5, 1933

23 Claims. (Cl. 196—36)

This invention relates to a process for treating products of petroleum distillation or pyrogenetic decomposition, as well as natural gasolines, for the purpose of improving the same as to color, odor, doctor test, and other characteristics desirable in a commercial product.

The present invention constitutes an improvement in a process for contacting light hydrocarbon vapors with hydrochloric acid.

The method as carried out in accordance with the invention is particularly concerned with the elimination of sulphur and gums from gasoline by continuous treatment of the gasoline in the vapor phase with hydrochloric acid and other materials capable of effecting a removal of sulphur and a polymerization of other undesirable constituents whereby these may be readily removed.

It has been more or less common to treat the distilled or cracked vapors from hydrocarbon oils with metallic chloride for the purpose of causing the recombination of the constituents into lighter forms. Many disadvantages have attended this type of process, however, and these disadvantages have been due, in no small degree, to the difficulty experienced in handling the metallic halide.

It has been discovered that a marked saving in time and expense can be accomplished by contacting the gasoline or other hydrocarbon fraction in vapor phase with metallic chlorides or oxides in suspension in a high-boiling non-aqueous medium in a suitable liquid-vapor contacting apparatus, such as a bubble-cap tower, for example, and adding a suitable amount of hydrochloric acid to the inflowing hydrocarbons.

This invention consists broadly in contacting with metallic chloride or oxide, a light hydrocarbon fraction, such as gasoline, and hydrochloric acid. Air or oxygen may also be added at a suitable point before or after entry of the hydrocarbon vapors into the contacting apparatus, as it is found that the oxygen exerts a beneficial effect in retarding the formation of undesirable sulphur compounds.

The invention may be more readily understood if reference is had to the accompanying drawing, in which.

Figure 1:
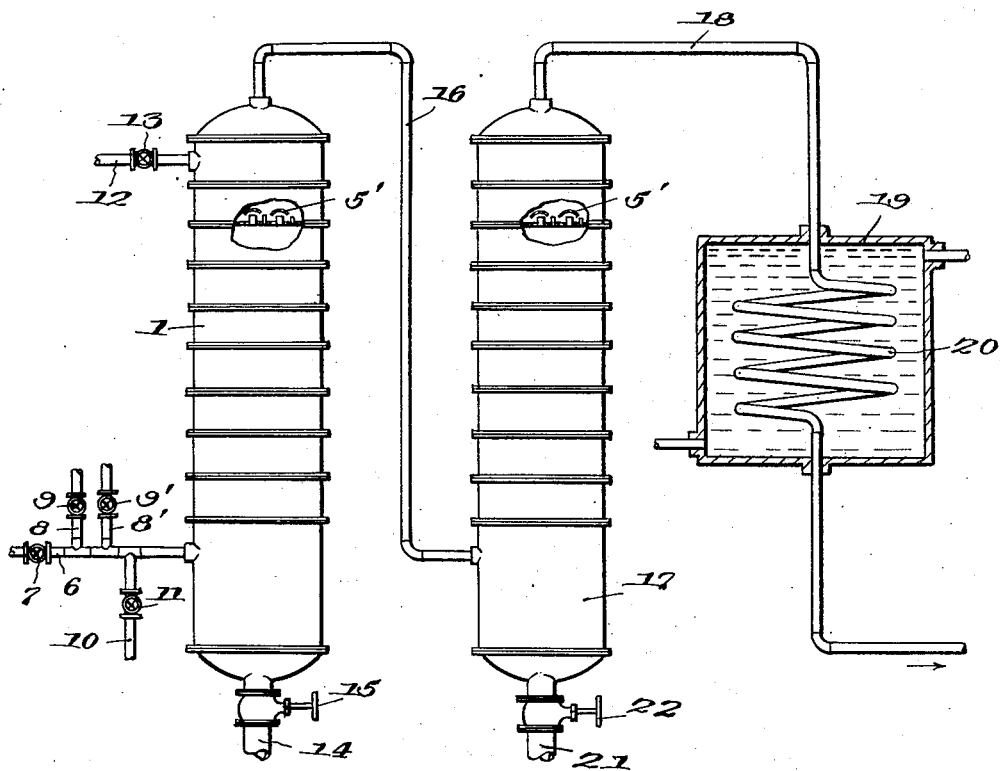
Figure 1 represents diagrammatically an apparatus in which the present invention may be carried out.
Figure 2:
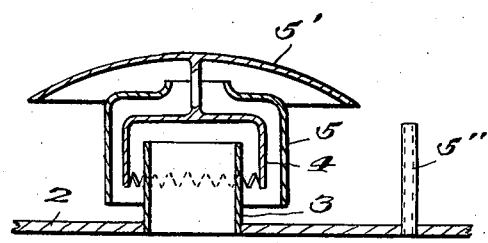
Figure 2 represents an enlarged view of one of the bubble-caps recommended for use, and indicated diagrammatically in the broken-away portion of Figure 1.

Referring to the drawing 1 represents a treating unit of the bubble-cap tower type, the bubble-caps being preferably of the type shown and described in my copending application, Serial No. 394,763, filed September 24, 1929. This type of bubble-cap tower is illustrated in Figure 2, in which 2 represents a horizontal bubble tray having a plurality of openings therein, each opening having its wall formed annularly as a single piece 3, extending upwardly as a pipe. 4 is a primary baffle covering the mouth of pipe 3 and spaced therefrom and having a downwardly flanged lower portion and a serrated lower edge. 5 represents a second baffle adjacent to its flanged portion and curved upwardly near its upper lip or edge, and 5' represents a cap for preventing splashing around the upper edge of the annular baffle. This construction has been found to furnish an intimate vapor-liquid contact, the vapor passing downwardly under the serrated lower edge of baffle 2 where it is broken up into bubbles, the bubbles rising with liquid around interior of annular baffle 5.

6 represents an inlet pipe for gasoline or other light hydrocarbon vapors, introduced from any suitable source, such as a cracking still, for example. This pipe is provided with valve 7 and leads into treating unit 1 near the lower end thereof. Leading into pipe 6 at suitable points is branch pipe 10, for the admission of hydrochloric acid gas from any suitable source, the flow of this gas being regulated by manipulating a valve 11. 12 represents a pipe leading into the upper part of treating unit 1 for the admission of metal chloride or oxide, this pipe being provided with valve 13, and 14 represents a pipe leading from the bottom of treating unit 1 for the withdrawal of spent metal chloride, this withdrawal pipe being provided with valve 15. From the top of treating unit 1 a pipe 16 leads to the bottom of a fractionation tower 17, this second unit being similar in construction to the first treating unit, but which is really a bubble-cap fractionating apparatus for making end-point gasoline. This tower is provided with an outlet pipe 18 near the top thereof leading to condenser 19, and through condenser coil 20 to storage. An outlet pipe 21, provided with valve 22, leads from the bottom of fractionating tower 17 to conduct away heavy ends or "bottoms". Pipes 14 and 18 may be provided with valves if it is desirable or necessary. A short pipe (not shown) provided with a control valve leads into the downgoing vertical portion of pipe 18, for the introduction of ammonia.

In the operation of the improved process as carried out in accordance with the present invention, valve 13 is opened and a suspension of metallic chloride or oxide, for example copper chloride or oxide, in a high boiling non-aqueous liquid, for example, a heavy lubricating oil, is admitted to treating unit 1 through pipe 12, where it builds up on the trays inside the unit and commences to overflow from one tray to the next. Valves 7, 11, and 9', in case it is desired to use air, are opened, to the required extent, and gasoline vapors, steam, and air begin to flow upwardly, and contact with the downflowing metallic compound suspension on the bubble trays. A prolonged and efficient contact is thus secured, the hydrochloric acid gas reacting with the hydrocarbon over the suspension of metallic compound as a contacting agent. The treated gasoline or other hydrocarbon vapors leaving treating unit 1 by pipe 16 pass into fractionating tower 17 where they are rectified to end-point gasoline, the bottoms being removed by pipe 21. The lighter fractions from tower 17 are conducted by pipe 18 through condenser 20 surrounded by water jacket 19, where they are condensed and the condensate conducted to storage. Ammonia may be introduced to neutralize any hydrochloric acid coming over with the vapors.

It is to be understood that this invention is not limited to the use of copper compounds, as any other metal compounds could be employed which behave like copper compounds.

In a prior process, I have shown the use of chlorides having boiling points high enough to remain liquid in the presence of a reasonable amount of steam and oil vapor. Therefore, according to that process, copper chloride alone could not be used, because it requires too much steam along with the hydrocarbon vapor to prevent the chloride solution from evaporating to crystals. But in order to remove sulphides a metal, such as copper, whose sulphide is insoluble in hydrochloric acid must be used. The use of a suspension of the chloride or oxide, as in the present invention, in a non-aqueous medium, enables the desired reaction to be effected, using chloride or oxide of copper or other metal whose sulphide is insoluble in hydrochloric acid, as a contacting agent.

It is to be understood as within the scope of this invention that the process may also be operated without using air, although air is beneficial in the treatment of metallic sulphide formed. In case air is not used, the metallic chloride used as a contacting agent may be regenerated and reused, going into the treating unit as a chloride or oxide and coming out in spent form as a sulphide which can then be settled or filtered from the heavy liquid medium and processed back to the chloride or oxide for reuse. The regenerated chloride or oxide is returned to the inlet pipe of the treating unit 1.

It is further contemplated that other reagents except air, capable of effecting a reaction with sulphides ordinarily insoluble in hydrochloric acid, and hydrochloric acid itself, may be introduced with the gasoline vapors and acid, in order to make the metallic sulphides dissolve. The sulphide-hydrochloric acid reaction might also be effected by using air outside the treating tower. The advantage of this process over the air treatment within the tower, or over processes using metal turnings as a contacting agent, are that the contacting agent may be continuously removed, bringing with it the non-aqueous medium for suspension of the chloride or oxide. The difficulty of controlling the air is further eliminated, as it is used at a remote point where it will not affect the color of the gasoline.

It has been found that when operating with metallic chloride in suspension, the practice of grinding the chloride crystals under oil greatly reduces the size of the chloride particles to an extent where they can be made to stay in suspension even in gasoline as a suspension medium. A thick mud is produced which operates perfectly with a bubble tower.

I claim:

1. A process of improving light hydrocarbons which process comprises contacting the hydrocarbon in vapor phase with a chloride of a metal whose sulphide is insoluble in hydrochloric acid, supplying to the hydrocarbon vapors before contacting them with the metallic chloride a substantial amount of hydrochloric acid gas, and collecting the resulting gasoline.

2. A process of improving light hydrocarbons, which process comprises contacting the hydrocarbon in vapor phase with a non-aqueous suspension of a chloride of a metal whose sulphide is insoluble in hydrochloric acid, supplying to the hydrocarbon vapors before contacting them with the metallic chloride a substantial amount of hydrochloric acid gas, and collecting the resulting gasoline.

3. A process of improving gasoline, which process comprises contacting the gasoline in vapor phase with a non-aqueous suspension of metallic chloride, supplying to the gasoline vapors before contacting them with the suspension of metallic chloride a substantial amount of hydrochloric acid, thereby producing a light gasoline fraction and heavy liquid ends containing spent metallic chloride in the form of sulphides, treating the heavy liquid ends with air and thereby converting the sulphides to corresponding oxides, treating said oxides with hydrochloric acid, thereby converting them to chlorides, and returning the chlorides thus formed to the non-aqueous suspension of metallic chloride, further treating the light gasoline fraction to produce end-point gasoline, and collecting the resultant end-point gasoline.

4. A process of improving gasoline, which process comprises contacting the gasoline in vapor phase with a non-aqueous suspension of a chloride of a metal whose sulphide is insoluble in hydrochloric acid, supplying to the gasoline vapors a substantial amount of hydrochloric acid gas and regulated quantities of air, and collecting the resultant gasoline.

5. A process of improving gasoline, which process comprises contacting the gasoline in vapor phase with a non-aqueous suspension of a chloride of a metal whose sulphide is insoluble in hydrochloric acid, supplying to the hydrocarbon vapors before contacting them with the metallic chloride substantial amounts of hydrochloric acid gas and a gaseous reagent capable of effecting reaction between the sulphide of the metal and hydrochloric acid, and collecting the resultant gasoline.

6. A process of improving light hydrocarbons which process comprises contacting the hydrocarbon in vapor phase with copper chloride in suspension in a heavy non-aqueous liquid medium, supplying to the hydrocarbon vapors before contacting them with the copper chloride a substantial amount of hydrochloric acid gas, and collecting the resultant gasoline.

7. A process of improving gasoline which process comprises contacting the gasoline in vapor phase with a non-aqueous suspension of copper chloride, supplying to the gasoline vapors before contacting them with the suspension of copper chloride a substantial amount of hydrochloric acid, thereby producing a light gasoline fraction and heavy liquid ends containing spent copper chloride in the form of sulphide, treating the liquid ends with air and thereby converting the sulphide to oxide, treating the oxide with hydrochloric acid, thereby converting the oxide to chloride, and returning the chloride thus formed to the non-aqueous suspension of metallic chloride, further treating the light gasoline fraction to produce end-point gasoline, and collecting the resultant end-point gasoline.

8. A process of improving light hydrocarbons which process comprises passing the hydrocarbon in vapor phase counter-current to and in direct contact with a chloride of a metal whose sulphide is insoluble in hydrochloric acid, supplying to the hydrocarbon vapors before contacting them with the metallic chloride a substantial amount of hydrochloric acid gas, and collecting the resulting gasoline.

9. A process of improving light hydrocarbons, which process comprises passing the hydrocarbon in vapor phase counter-current to and in direct contact with a non-aqueous suspension of a chloride of a metal whose sulphide is insoluble in hydrochloric acid, supplying to the hydrocarbon vapors before contacting them with the metallic chloride a substantial amount of hydrochloric acid gas, and collecting the resulting gasoline.

10. A process of improving gasoline, which process comprises passing the gasoline in vapor phase countercurrent to and in direct contact with a non-aqueous suspension of metallic chloride, supplying to the gasoline vapors before contacting them with the suspension of metallic chloride a substantial amount of hydrochloric acid, thereby producing a light gasoline fraction and heavy liquid ends containing spent metallic chloride in the form of sulphide, treating the heavy liquid ends with air and thereby converting the sulphide to oxide, treating the oxide thus formed with hydrochloric acid and thereby converting the oxide to chloride, returning the chloride thus formed to the non-aqueous suspension of metallic chloride, further treating the light gasoline fraction to produce end-point gasoline, and collecting the resultant end-point gasoline.

11. A process of improving gasoline, which process comprises passing the gasoline in vapor phase countercurrent to and in direct contact with a non-aqueous suspension of a chloride of a metal whose sulphide is insoluble in hydrochloric acid, supplying to the gasoline vapors a substantial amount of hydrochloric acid gas and regulated quantities of air, and collecting the resultant gasoline.

12. A process of improving gasoline, which process comprising passing the gasoline in vapor phase countercurrent to and in direct contact with a non-aqueous suspension of a chloride of a metal whose sulphide is insoluble in hydrochloric acid, supplying to the hydrocarbon vapors before contacting them with the metallic chloride substantial amounts of hydrochloric acid gas and a gaseous reagent capable of effecting reaction between the sulphide of the metal and hydrochloric acid, and collecting the resultant gasoline.

13. A process of improving light hydrocarbons which process comprises passing the hydrocarbon in vapor phase countercurrent to and in direct contact with copper chloride in suspension in a heavy non-aqueous liquid medium, supplying to the hydrocarbon vapors before contacting them with the copper chloride a substantial amount of hydrochloric acid gas, and collecting the resultant gasoline.

14. A process of improving gasoline which process comprises passing the gasoline in vapor phase countercurrent to and in direct contact with a non-aqueous suspension of copper chloride, supplying to the gasoline vapors before contacting them with the suspension of copper chloride a substantial amount of hydrochloric acid, thereby producing a light gasoline fraction and heavy liquid ends containing spent copper chloride in the form of sulphide, treating the liquid ends with air and thereby regenerating copper chloride, returning the regenerated copper chloride to the non-aqueous suspension of copper chloride, further treating the light gasoline fraction to produce end-point gasoline, and collecting the resultant end-point gasoline.

15. A process of improving light hydrocarbons, which process comprises contacting the hydrocarbon to be improved in vapor phase with a suspension of an oxide of a metal whose sulphide is insoluble in hydrochloric acid, supplying to the hydrocarbon vapors before contacting them with the metallic oxide a substantial amount of hydrochloric acid gas, and collecting the resulting improved hydrocarbons.

16. A process of improving gasoline, which process comprises contacting the gasoline to be improved in vapor phase with a non-aqueous suspension of an oxide of a metal whose sulphide is insoluble in hydrochloric acid, supplying to the hydrocarbon vapors before contacting them with the metallic oxide substantial amounts of hydrochloric acid gas and a gaseous reagent capable of effecting reaction between the sulphide of the metal and hydrochloric acid, and collecting the resultant gasoline.

17. A process of improving light hydrocarbons which process comprises passing the hydrocarbon to be improved in vapor phase countercurrent to and in direct contact with an oxide of a metal whose sulphide is insoluble in hydrochloric acid, supplying to the hydrocarbon vapors before contacting them with the metallic oxide a substantial amount of hydrochloric acid gas, and collecting the resulting improved hydrocarbon.

18. A process of improving gasoline, which process comprises passing the gasoline to be improved in vapor phase countercurrent to and in direct contact with a non-aqueous suspension of an oxide of a metal whose sulphide is insoluble in hydrochloric acid, supplying to the gasoline vapors before contacting them with the suspension of metallic oxide a substantial amount of hydrochloric acid, thereby producing a light gasoline fraction and heavy liquid ends containing spent metallic chloride and oxide in the form of sulphide, treating the heavy liquid ends with air and thereby converting the sulphide to oxide, treating the oxide thus formed with hydrochloric acid, thereby producing chloride, returning the chloride thus produced to the non-aqueous suspension of metallic oxide, further treating the light gasoline fraction to produce end-point gasoline, and collecting the resultant end-point gasoline.

19. A process of improving gasoline which process comprises contacting the gasoline to be improved in vapor phase with a non-aqueous suspension of copper chloride, supplying to the gasoline vapors before contacting them with the suspension of copper chloride a substantial amount of hydrochloric acid, thereby producing a light gasoline fraction and heavy liquid ends containing spent copper chloride in the form of sulphide, removing the liquid ends, treating the liquid ends with air and thereby converting the sulphide to oxide, returning the oxide thus formed to the non-aqueous suspension of copper chloride concurrently with additional amounts of hydrochloric acid, thereby converting the oxide to chloride, further treating the light gasoline fraction to produce end-point gasoline, and collecting the resultant end-point gasoline.

20. A process for refining light hydrocarbon vapors which comprises adding hydrochloric acid gas to the vapors and passing the resultant mixture into contact with a non-aqueous suspension of a compound selected from a group which consists of the chlorides and oxides of the metals whose sulphides are insoluble in hydrochloric acid, said compound having the property of functioning as a contact agent in the process.

21. A process for desulphurizing light petroleum distillates of the character of gasoline which comprises treating the same with added hydrochloric acid in the presence of a compound selected from the group consisting of the chlorides and oxides of the metals whose sulphides are insoluble in hydrochloric acid.

22. A process for desulphurizing light petroleum distillates of the character of gasoline which comprises treating the same with added hydrochloric acid in the presence of copper chloride.

23. A process for desulphurizing light petroleum distillates of the character of gasoline which comprises treating the same with added hydrochloric acid in the presence of copper oxide.

ROLAND B. DAY.